United States Patent

Omi et al.

[11] Patent Number: 5,938,378
[45] Date of Patent: Aug. 17, 1999

[54] APPARATUS FOR BORING WEBS OF STEEL SECTIONS

[75] Inventors: Shohei Omi, Anjo; Chikayuki Urashima; Taro Ishikawa, both of Kitakyushu, all of Japan

[73] Assignee: Omi Kogyo Co. Ltd., Japan

[21] Appl. No.: 08/860,933

[22] PCT Filed: Nov. 7, 1996

[86] PCT No.: PCT/JP96/03255

§ 371 Date: Jul. 9, 1997

§ 102(e) Date: Jul. 9, 1997

[87] PCT Pub. No.: WO97/17156

PCT Pub. Date: May 15, 1997

[30] Foreign Application Priority Data

Nov. 9, 1995 [JP] Japan .................................. 7-317516

[51] Int. Cl.[6] .................................................. B23B 39/00
[52] U.S. Cl. ............................................. 408/103; 408/95
[58] Field of Search .............................. 403/79, 95, 103, 403/100, 135, 137, 101, 138, 234

[56] References Cited

U.S. PATENT DOCUMENTS

| | | | |
|---|---|---|---|
| 981,791 | 1/1911 | Oslund | 408/95 |
| 990,115 | 4/1911 | Coulter | 408/95 |
| 1,016,477 | 2/1912 | Coulter | 408/95 |
| 1,034,288 | 7/1912 | Oslund | 408/95 |
| 1,175,556 | 3/1916 | Place et al. | 408/95 |
| 2,113,723 | 4/1938 | Everett | 408/95 |
| 2,201,032 | 5/1940 | Everett | 408/95 |
| 2,203,415 | 6/1940 | Lavarack et al. | 408/95 |
| 2,599,696 | 6/1952 | Clark | 408/95 |
| 4,261,673 | 4/1981 | Hougen | 408/135 |
| 4,932,814 | 6/1990 | York | 408/138 |
| 5,061,126 | 10/1991 | Cain et al. | 408/209 |

FOREIGN PATENT DOCUMENTS

| | | |
|---|---|---|
| 59-69841 | 5/1984 | Japan . |
| 5-345210 | 12/1993 | Japan . |

*Primary Examiner*—Andrea L. Pitts
*Assistant Examiner*—Adesh Bhargava
*Attorney, Agent, or Firm*—Fish & Richardson P.C.

[57] ABSTRACT

The apparatus for boring a web of a section. The apparatus is provided with a boring device which is opposed perpendicular to the web of a clamped section and arm plates for supporting the boring device. The apparatus further has a clamping mechanism for clamping the section from each side thereof along the direction substantially parallel to the rotational axis of the boring device.

12 Claims, 6 Drawing Sheets

APPARATUS FOR BORING WEBS OF STEEL SECTIONS

This is a continuation of International Patent Application No. PCT/JP96/03255, with an international filing date of Nov. 7, 1996, now pending.

BACKGROUND OF THE INVENTION

1. Field of the Invention

The present invention relates to a portable electric drill type boring apparatus for boring webs of steel sections such as rails, H sections, I sections and channels.

2. Description of the Related Art

Figure 8:
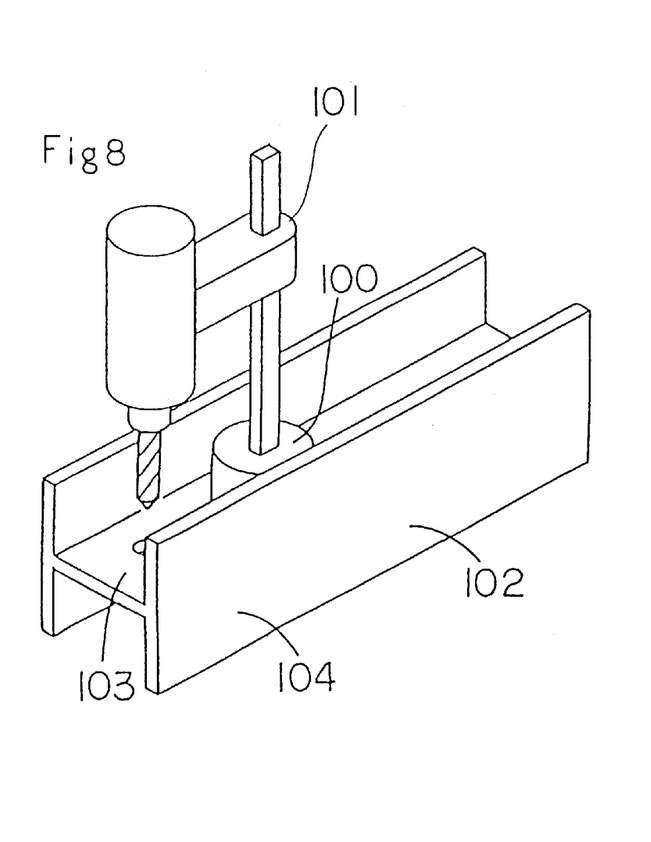
FIG. 8 illustrates a case where an H section is bored using the first prior art boring apparatus.

FIG. 8 illustarates a boring apparatus 101 according to a first prior art. This apparatus 101 is a portable electric drill having a magnetic fixing device 100. Procedures of drilling a web 103 of an H section 102 using this boring apparatus 101 will be described referring to FIG. 8.

First, the H section 102 is placed such that the web 103 thereof may be substantially horizontal, and the fixing device 100 is disposed at a predetermined position on the surface of the web 103. The fixing device 100 is fixed on the web 103 by the magnetic force of a magnet. Next, the boring apparatus 101 is descended to drill downward the web 103 at the predetermined position. Drilling of a web of a channel can be performed in the same manner as in the drilling of the H section.

A special section boring apparatus is also known as a second prior art. This boring apparatus drills both flanges 104 and a web 103 using separate drills respectively.

Further, Japanese Unexamined Patent Publication No. Hei 7-9222 descloses a boring apparatus as a third prior art. This boring apparatus described therein has a pair of clamping plates for clamping a pair of side walls of a channel and a drill which is disposed to be movable toward a web present between the thus clamped side walls of the channel. Accordingly, the web can be drilled by operating the drill with the channel being clamped by the clamping plates.

However, according to the first prior art, a section must be placed such that the face to be drilled or the web thereof may assume a horizontal posture and then the fixing device 100 is mounted on the horizontal face, because the boring apparatus 101 is merely magnetically fixed on the web 103, and if the web 103 is not maintained horizontally, the apparatus 101 readily slips out of position.

However, when a heavy section is to be drilled, the section must be handled by a crane so as to allow the face to be drilled thereof to assume a horizontal posture, and in the case of a light section, it must be handled manually by workers, requiring very intricate procedures.

Further, this boring apparatus 101 involves a problem that positioning of the drill at a predetermined point requires intricate procedures since it employs a large and heavy magnet, and thus the apparatus has poor drilling efficiency.

Meanwhile, the special boring apparatus according to the second prior art is generally big and heavy and is a stationary equipment, so that a section must be carried to the apparatus. The section is placed once on a work-table of the apparatus and then set at a drilling position. Accordingly, it takes time and labor to carry sections to the special boring apparatus and also to load and unload the section to and from the work-table.

In the third prior art, a section such as a channel and an H section is clamped by clamping plates before it is subjected to drilling. Accordingly, the section placed on the floor cannot be clamped as such, so that webs of sections placed on the floor cannot be drilled, disadvantageously.

It is a primary objective of the present invention to provide a boring apparatus which enables an operator to bore a web of a section with a lower flange thereof being placed on the floor.

SUMMARY OF THE INVENTION

In order to attain the above-described objective, the section web boring apparatus according to the present invention has a boring device for boring a web of a clamped section in the state where the axis of the boring device is perpendicular to the web; a frame for supporting the boring device; and a clamping mechanism for claming the section from each side in the direction substantially parallel to the rotation axis of the boring device.

Therefore, according to the present invention, a section placed on the floor can be clamped by the clamping mechanism, and an edge of the boring device can bore the web of the thus clamped section.

DETAILED DESCRIPTION OF THE PREFERRED EMBODIMENTS

A first embodiment according to the present invention will be described specifically referring to FIGS. 1 to 5.

A schematic constitution of a section web boring apparatus 10 will be described. Parts constituting the section web boring apparatus 10 are made of materials having sufficient strength such as iron and stainless steel. In this embodiment, the left side and the right side in FIG. 3 are appreciated to be the front side and the rear side, respectively.

Figure 1:
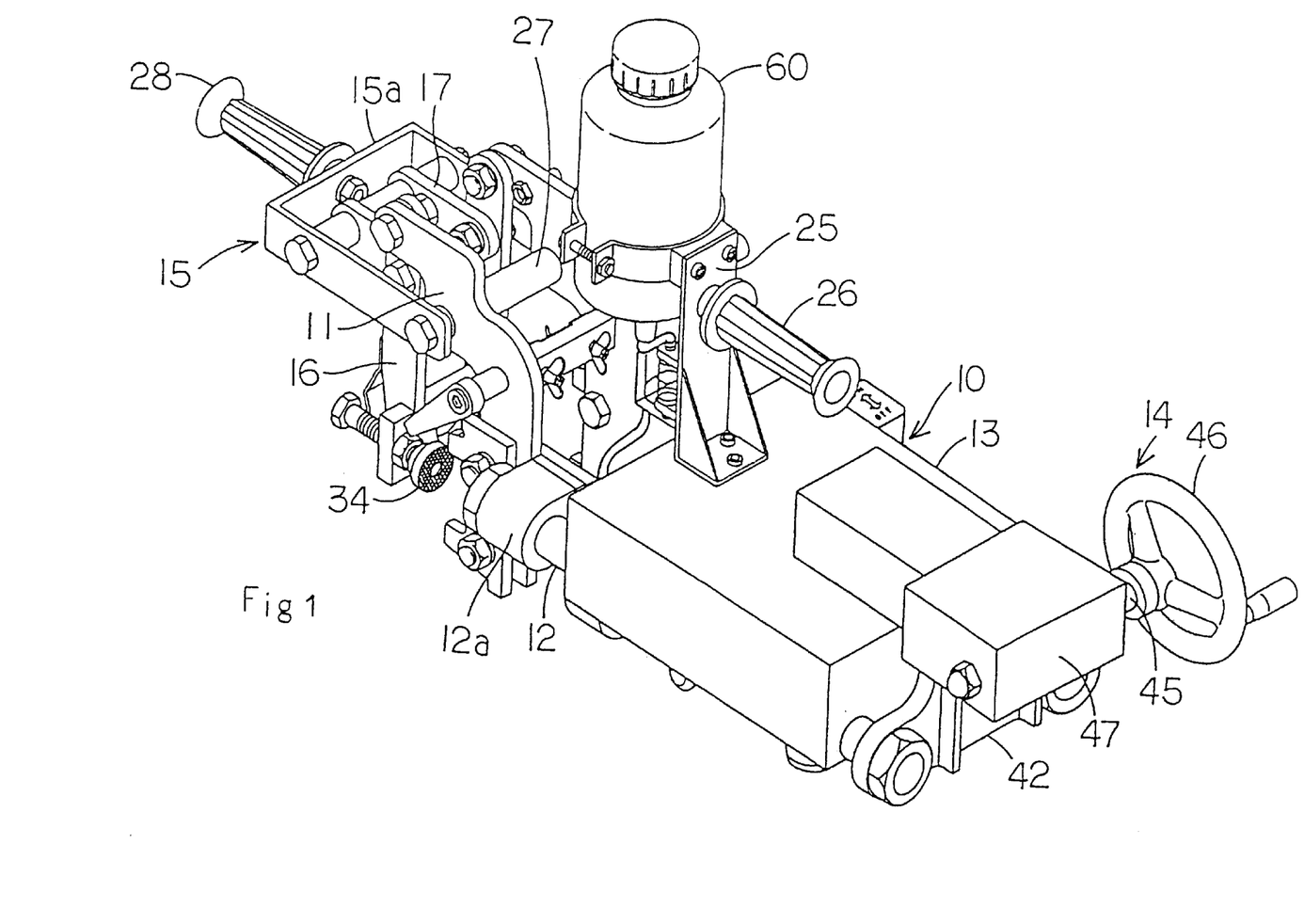
FIG. 1 shows a perspective view of the apparatus for boring webs of sections according to one embodiment of the invention.
Figure 3:
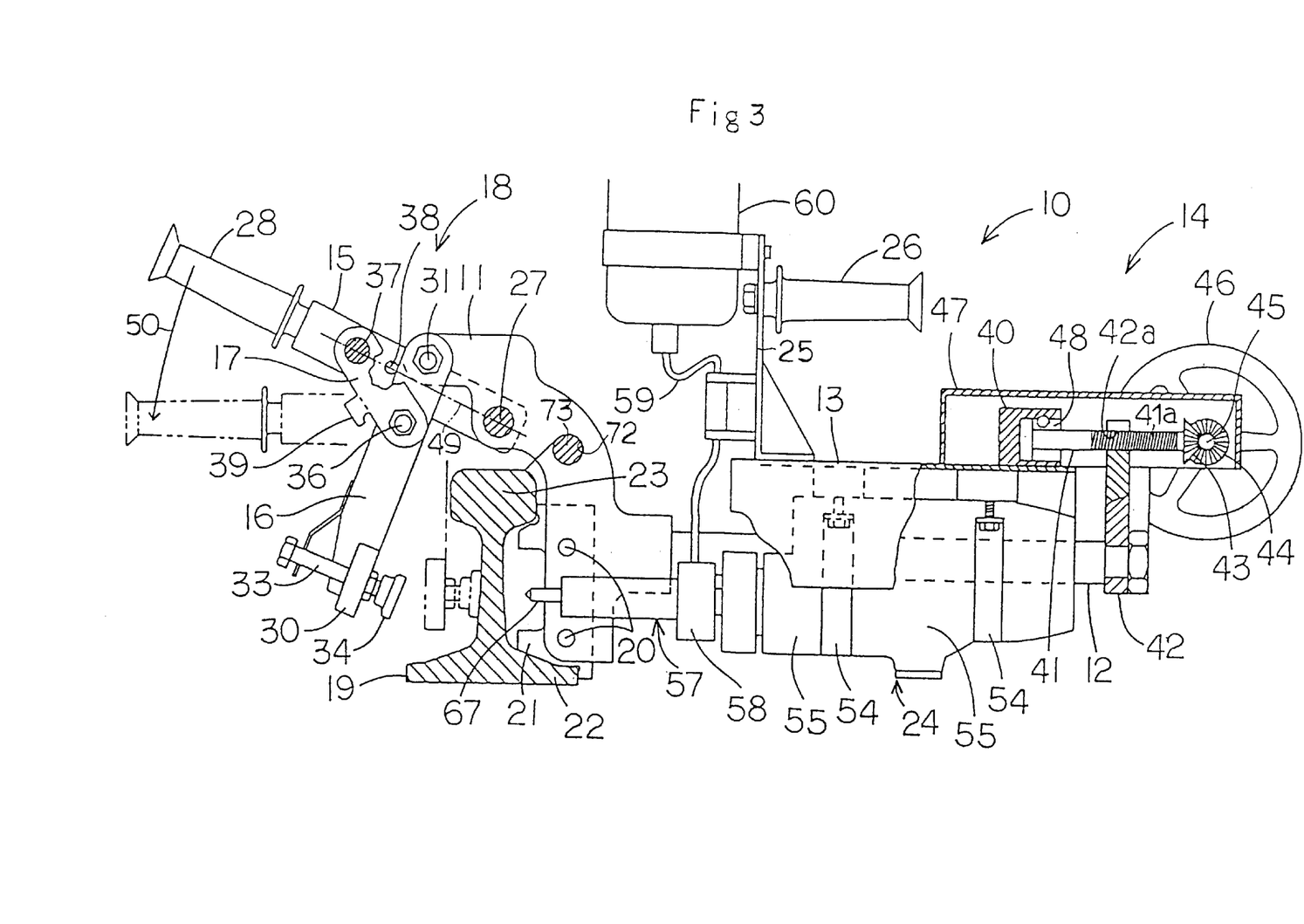
FIG. 3 shows a cross section of the apparatus shown in FIG. 1.

As shown in FIGS. 1 and 3, the boring apparatus 10 has a frame consisting of a pair of arm plates 11 connected and fixed to each other. A pair of guide rails 12 are fixed to the proximal end portions of the arm plates 11 respectively. A table 13 is slidably attached to the guide rails 12. A grip 26 is fixed on the table 13 on the center line thereof via a bracket 25. As shown in FIG. 3, a boring device 24 is located under the table 13. A clamping device 18 for clamping a section 19 is provided at the distal end portions of the arm plates 11. A moving mechanism 14 for advancing and retracting the boring device 24 is provided on the rear side of the table 13.

Figure 2:
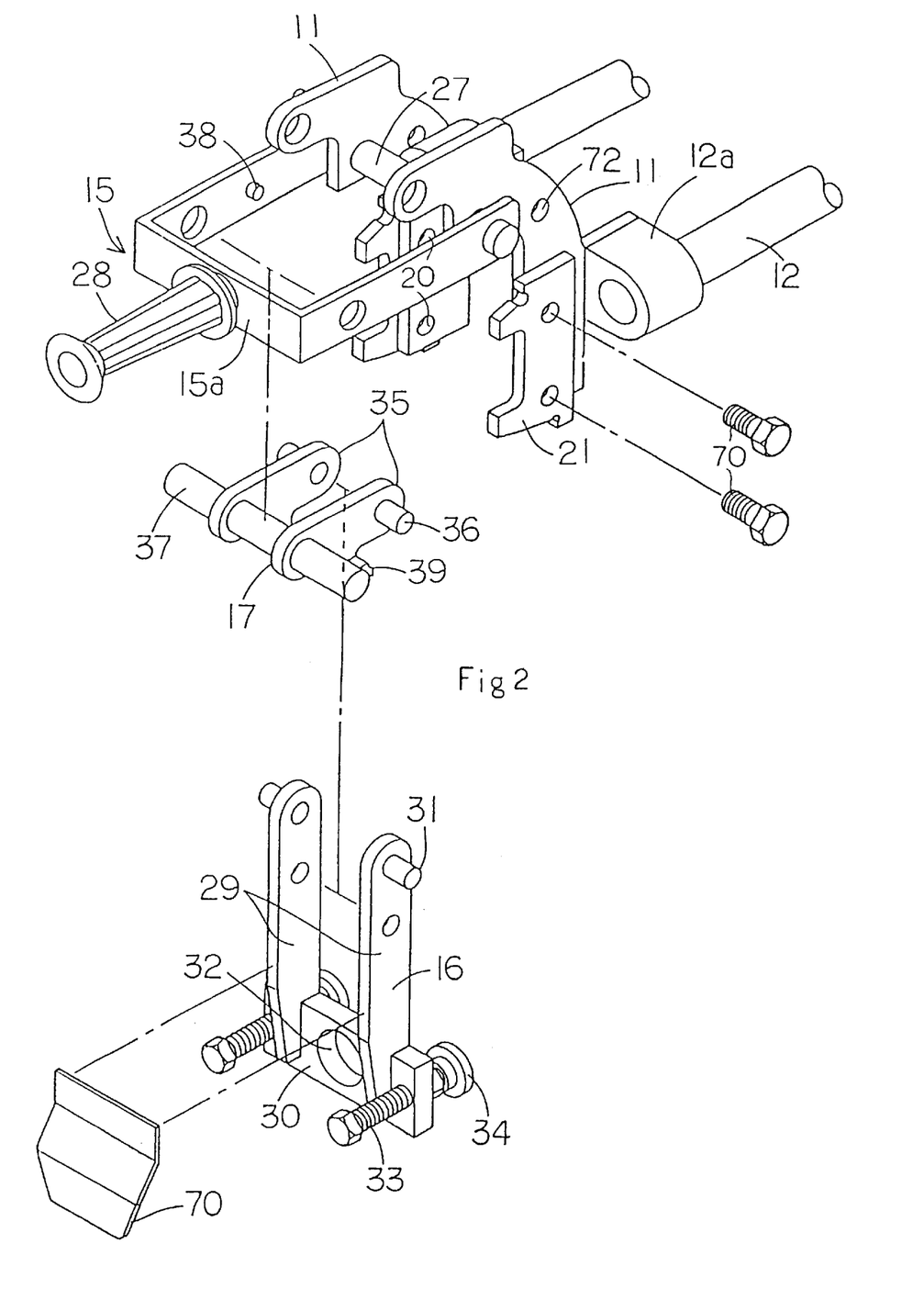
FIG. 2 shows partially a perspective exploded view of the apparatus shown in FIG. 1.

As shown in FIGS. 1 to 3, the pair of arm plates 11 are connected to each other at the middle parts thereof by a support shaft 27. Roughly speaking, the lower half of each arm plate 11 locates on the rear side of the section 19; whereas the upper half overhangs the section 19 to extend to the front side of the section 19. Jigs 21 are attached to the lower parts of the arm plates 11 by screws 70. The screws 70 are inserted to screw holes 20 of the arm plates 11 via the jigs 21, and the jigs 21 are fastened to the arm plates 11 by tightening the screws 70. It is also possible to form vertical slots as the screw holes 20 of the arm plates 11 or as those of the jigs 21 and thus to adjust the fixing positions of the jigs 21 in the vertical direction with respect to the arm plates 11.

The jig 21, so as to hold the section 19, has a shape fitting to the profile of the section 19. In this embodiment, the lower part and the upper part of each jig 21 are designed to be abutted against the upper face of the lower flange 22 and the lower face of the head 23 of the section 19, respectively.

As shown in FIG. 2, the front ends of the guide rails 12 are attached via metal fittings 12a to the proximal ends of the arm plates 11 respectively. The pair of guide rails 12 are arranged to be parallel to each other and to be horizontal in the state where the boring apparatus 10 is set against the section 19.

The clamping device 18 will be hereinafter described. This device 18 is provided with a toggle latch mechanism.

As shown in FIG. 3, the clamping device 18 consists of an operating lever 15 pivotally fixed to the support shaft 27, a working lever 16 pivotally connected via pintles 31 to the arm plates 11, and an intermediate link 17 pivotally attached to the working lever 16 and the operating lever 15.

As shown in FIGS. 1 to 3, the operating lever 15 has a substantially U-shaped proximal end portion 15a which is pivotally attached to each end of the support shaft 27 on the outer sides of the arm plates 11. The distal end portion of the operating lever 15 constitutes a grip 28. As shown in FIG. 2, the working lever 16 has a pair of arm plates 29 and a connecting plate 30 which connects the arm plates 29 to each other at the lower parts thereof. A pintle 31 is formed to protrude outward from the upper end portion of each arm plate 29. A through hole 32 is formed at the center of the connecting plate 30. Bolts 33 are screwed into each end portion of the connecting plate 30. A pressing plate 34 to be abutted against the web of the section 19 is provided at the tip of each bolt 33. The advancement quantity of the pressing plates 34 can be adjusted by turning the bolts 33.

The intermediate link 17 has a pair of link plates 35 and an operating shaft 37 provided at the proximal end portions of these link plates 35 to connect them to each other. A pair of working shafts 36 protrude outward from the distal end portions of these link plates 35. The intermediate link 17 is pivotally attached to the operating lever 15 by the operating shaft 37 and to the working lever 16 by the working shaft 36.

Procedures of clamping the section 19 by operating the operating lever 15 will be described. The grip 28 of the operating lever 15 is turned counterclockwise as shown by the arrow 50 on the support shaft 27. Thus, the working lever 16 is turned on the pintles 31 via the intermediate link 17 to allow the pressing plates 34 to approach the section 19. Since the operating lever 15 and the intermediate link 17 constitute the toggle mechanism, the operating force of the operating lever 15 is amplified by the toggle mechanism to allow the working lever 16 to urge the pressing plates 34 against the web of the section 19 by the thus amplified pressure (see two-dot chain line in FIG. 3).

It should be noted here that the axis of the working shaft 36 ascends relative to a line 49 drawn to connect the axis of the support shaft 27 and the axis of the operating shaft 37 as the operating lever 15 is turned. If the axis of the working shaft 36 ascended beyond the dead point on the line 49, the operating lever 15 is prevented from turning in the opposite direction. In this embodiment, when the axis of the working shaft 36 descended slightly beyond the line 49 to allow the working lever 16 to locate at the position indicated by the two-dot chain line, the pressing plates 34 are adapted to be pressed against the section 19 so that clamping by the pressure plates 34 may not be easily released.

A pair of stoppers 38 are provided on the inner faces of the operating lever 15 at the proximal end portion 15a, as shown in FIGS. 1 and 2. These stoppers 38 are abutted against the working lever 16 when the operating lever 15 is turned clockwise to restrict clockwise turning of the working lever 16. Meanwhile, another pair of stoppers 39 are provided on the outer surfaces of the intermediate link 17. These stoppers 39 are abutted against the working lever 16 when the operating lever 15 is turned counterclockwise to restrict counterclockwise turning of the working lever 15.

The boring apparatus 10 can be carried to be set against the section 19 as described below.

An operator grips the grips 26, 28 to pull up the grip 28 while the grip 26 is pressed downward. Thus, the operating lever 15 is turned clockwise on the support shaft 27, and the working lever 16 is also turned clockwise via the intermediate link 17. Now that the working lever 16 is turned, the distance between the jigs 21 and the pressing plates 34 is widened. Accordingly, a space for receiving the section 19 can be defined between the jigs 21 and the pressing plates 34.

The working lever 16 is restricted from turning any further, when the working lever 16 is abutted against the stoppers 38 as the operating lever 15 is turned. The boring apparatus 10 can be lifted with the handles 26, 28 being gripped by the operator in this state.

The boring apparatus 10 thus lifted is carried as such over the section 19, and then the apparatus 10 is descended such that the section 19 may locate between the jigs 21 and the pressing plates 34.

Subsequently, the grip 28 is pulled down. Thus, the operating lever 15 is turned counterclockwise on the support shaft 27, and the working lever 16 is turned counterclockwise together with the intermediate link 17. With this turning of the intermediate link 17, the stoppers 39 are abutted against the working lever 16 and simultaneously the pressing plates 34 are pressed against the section 19. In this process, the axis of the working shaft 36 ascends beyond the line 49. The section 19 is securely clamped between the pressing plates 34 and the jigs 21.

Next, the moving mechanism 14 for moving the table 13 will be described.

As shown in FIG. 3, the table moving mechanism 14 contains a handle 46 disposed on the rear side of the table 13, a main shaft 41 to which rotation of the handle 46 is transmitted, and a bracket 42 which interlocks with the rotation of the main shaft 41.

The handle 46 is rotatably attached to an auxiliary case 47 mounted on the rear end portion of the table 13. A first bevel gear 44 is attached to that end portion of a rotary shaft 45 of the handle 46 which protrudes into the table 13.

The main shaft 41 is disposed in the auxiliary case 47. The front end portion of the main shaft 41 is nondislocatably and rotatably supported in a fitting hole 48 of a connecting block 40 fixed on the table 13. A second bevel gear 43 is attached to the rear end portion of the main shaft 41 and is meshed with the first bevel gear 44. A thread groove 41a is formed on the circumference of the main shaft 41.

A fitting hole 74 having a thread groove 42a is defined at the upper end portion of the bracket 42, and the main shaft 41 is inserted to this fitting hole 74. The thread groove 42a formed on the bracket 42 is meshed with the thread groove 41a of the main shaft 41. The lower end portion of the bracket 42 is secured to the rear end portion of the guide rails 12.

When the handle 46 is turned manually, the main shaft 41 is rotated via the first and second bevel gears 44, 43. With the rotation of these gears 44, 43, the position at which the thread groove 41a of the main shaft 41 is meshed with the female thread 42a of the bracket 42 changes, and thus the connecting block 40, the case 47, the handle 46 and the table 13 fixed to the connecting block 40 can be advanced or retracted along the guide rails 12.

Now, the boring device 24 will be described.

Figure 4:
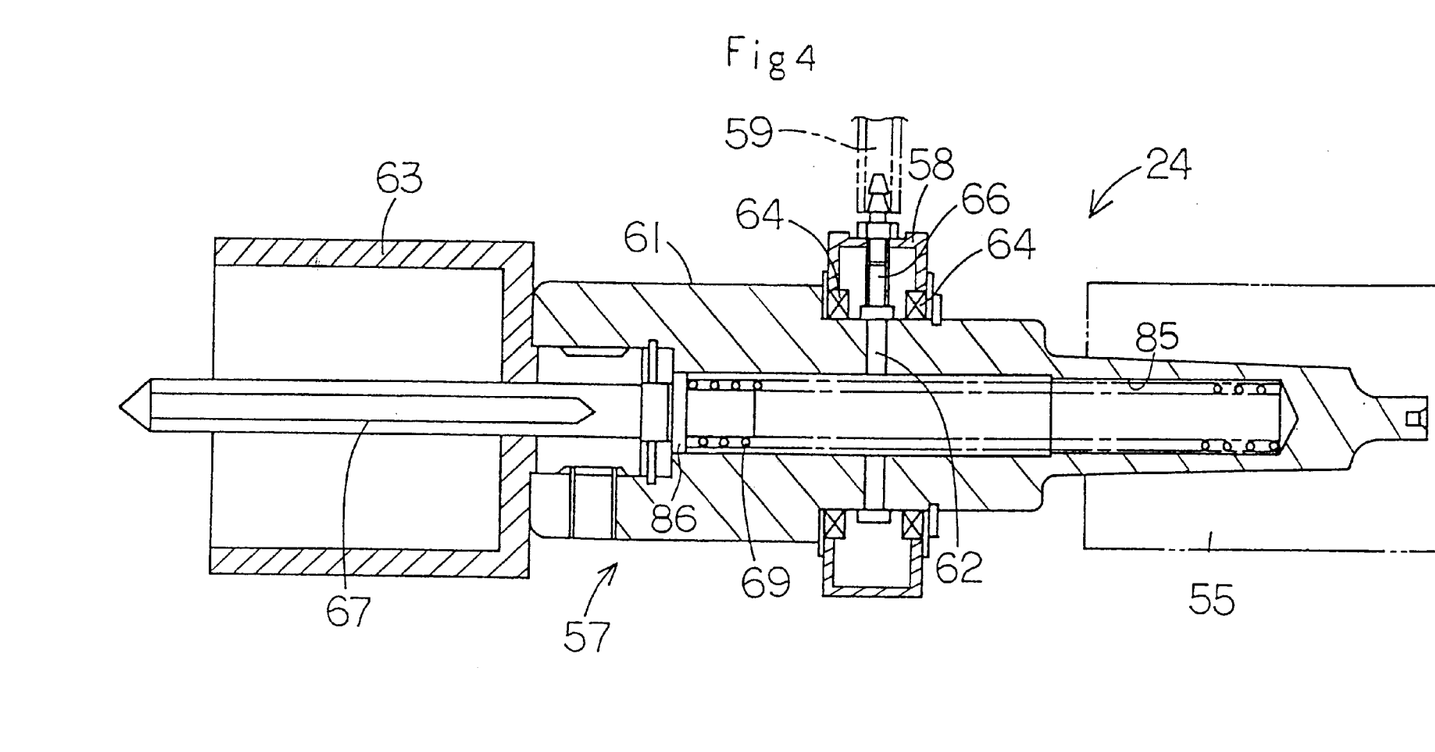
FIG. 4 shows a partial cross-sectional view of the boring device in the apparatus shown in FIG. 1.

As shown in FIG. 3, the boring device 24 is attached to the lower surface of the table 13 by holders 54. The boring device 24 has a motor 55 and a cutter 57 having a centering pin. The cutter 57 having a centering pin consists, as shown in FIG. 4, of a holder 61, a cup-like edge 63 attached to the front end of the holder 61, and a centering pin 67 provided in the edge 63. The centering pin 67 is disposed on the axis of the edge 63. A passage 85 is defined in the holder 61 to open to the front end side. A coil spring 69 is disposed in the passage 85. The centering pin 67 has a flange 86 at the inner end thereof. Since the coil spring 69 is engaged with the flange 86, the front end opening of the passage 85 is closed by a valve (not shown) housed in the flange 86 in the state where the tip of the centering pin 67 is not abutted against the section 19. When the tip of the centering pin 67 is abutted against the section 19 to allow the flange 86 to retract inward against the urging force of the coil spring 69 to be spaced apart from the front end opening of the passage 85, the valve opens the front end opening of the passage 85.

A communication hole 62 is formed to communicate to the passage 85 and to the outer surface of the holder 61. A lubrication ring 58 is provided on the circumference of the holder 61. The lubrication ring 58 has an annular form and is designed to be turned relative to the holder 61. Sealants 64 made of a rubber, a resin or the like are applied along the inner circumference of the lubrication ring 58. The lubrication ring 58 contains a through hole 66 which communicates to a lubricating oil pipe 59. The through hole 66 communicates to the communicating hole 62 of the holder 61. The lubrication ring 58 is connected via the lubricating oil pipe 59 to a cutting lubricant tank 60 shown in FIG. 1. A cutting lubricant is stored in the tank 60.

The cutting lubricant supplied from the cutting lubricant tank 60 passes through the lubricating oil pipe 59 to enter the lubrication ring 58 and further flows through the communicating hole 62 to the passage 85. When the centering pin 67 is abutted against the section 19 to be retracted against the urging force of the coil spring 69, the passage 85 assuming the closed state is opened to allow the cutting lubricant present in the passage 85 to flow toward the centering pin 67.

Next, boring actions of the boring device 24 will be described.

Under boring operation, the tip of the centering pin 67 is pressed against the center of a portion of the section web to be bored, and the cutting lubricant is supplied from the passage 85 into the edge 63 to effect cooling of the edge 63 and washing of the portion to be bored. After completion of the boring operation, the centering pin 67 is projected again by the urging force of the coil spring 69 to thrust off cutting chips thus formed. The thus thrust off chips pass through the through hole 32 defined at the center of the connecting plate 30 to impinge upon a cover 70 and drop.

After boring, the handle 46 is turned in the opposite direction to pull the edge 63 apart from the section 19, and then the grip 28 is pulled up to allow the working link 16 to be spaced from the section 19.

Subsequently, the operator grips the grips 26, 28 and lifts the boring apparatus 10, and thus the boring apparatus 10 can be released from the section 19.

A pointing device 71 will be hereinafter described.

Figure 5:
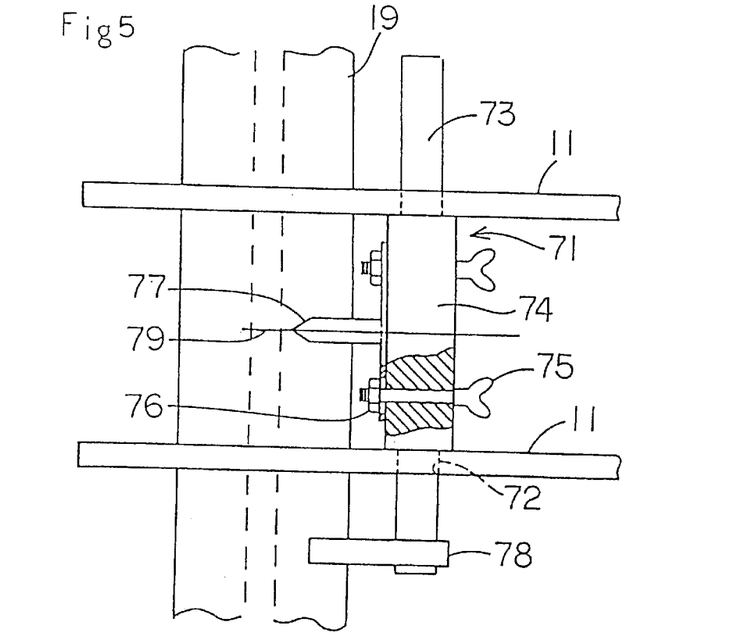
FIG. 5 shows a partial plan view illustrating the apparatus shown in FIG. 1 in use.

A pointing device 71 is disposed between the arm plates 11, as shown in FIG. 5. The pointing device 71 has a pivotal shaft 73 inserted to through holes 72 defined through the arm plates 11, a pointer 77 attached to the rotary shaft 73, and a lever 78 attached to one end of the rotary shaft 73. The pointer 77 is fixed to the rotary shaft 73 by thumbscrews 75 and nuts 76.

Procedures of positioning the boring apparatus employing the pointing device 71 will be hereinafter described.

A mark 79 is drawn on the upper end face of the section 19 straight above the position to be bored. When the boring apparatus 10 is set down against the section 19, the lever 78 of the pointing device 71 is turned to locate the pointer 77 on the upper end face of the section 19. At this stage, if the pointer 77 does not point the mark 79, the boring apparatus 10 is slid in the longitudinal direction of the section 19 to align the pointer 77 with the mark 79. The grip 28 is pulled down when the boring apparatus 10 is moved to a position where the pointer 77 points the mark 79, and the boring apparatus 10 can be fixed to a predetermined boring position.

Subsequently, if the boring device 24 is rotationally driven and the handle 46 is brought closer to the web of the section 19, the web of the section 19 can be bored by the edge 63 of the boring device 24 attached to the table 13.

This embodiment having the constitution described above can exhibit the following effects:

(1) The section 19 need not be lifted to be placed on the work-table so as to be subjected to boring or tumbled over to allow the face to be bored to assume a horizontal posture, so that the web can be bored easily and speedily;

(2) Since the operating lever 15, the working lever 16 and the intermediate link 17 constitute a toggle mechanism, the section 19 can be clamped powerfully by this mechanism;

(3) When the section 19 is to be clamped, if the axis of the working shaft 36 locates upper than the line 49 drawn to connect the axis of the support shaft 27 and the axis of the operating shaft 37, the operating lever 15 is prevented from turning in the opposite direction. Since the axis of the working shaft 36 locates upper than the line 49 in the state where the section 19 is clamped, the working lever 15 is prevented from turning erroneously in opposite direction;

(4) Under the boring operation, the tip of the centering pin 67 is normally pressed against the center of the portion to be bored in the web of the section 19. Accordingly, the tip of the edge 63 can be prevented from being oscillated by the cutting resistance, and thus the cutting performance can be improved. Further, immediately after completion of cutting, the centering pin 67 is projected again by the urging force of the coil spring 69 to thrust off cutting chips, facilitating cleaning of the bored portion; and (5) The boring apparatus 10 can be utilized for boring various types of sections if the jigs 21 are replaced with corresponding ones. Further, bores having desired sizes can be readily formed in the webs of sections by employing a drill when small-diameter holes are to be formed or by employing a cutter with a centering pin when large-diameter holes are to be formed.

The present invention can be realized according to other embodiments.

Figure 6:
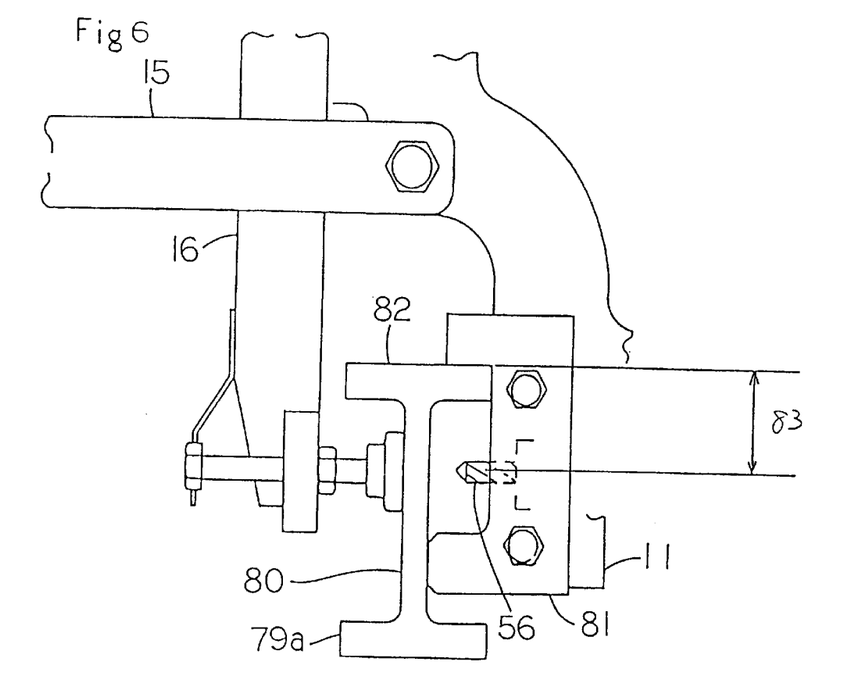
FIG. 6 is a view illustrating a case where an H section is bored using a boring apparatus according to another embodiment of the invention.

FIG. 6 shows another embodiment of the present invention which employs jigs 81 which are different from those employed in the foregoing embodiment. The jigs 81 are engaged with the upper flange 82 of an H section 79a. In this embodiment, a drill 56 is employed as the boring device. The boring position can be changed by adjusting the fitting position of the jigs 81 in the vertical direction to change the distance 83.

The boring apparatus of the present invention can be employed for boring not only H sections but also other sections (e.g., I sections and channels), and the shape of the jigs can be changed as necessary.

While adjustment of the boring position in the web of the section can be achieved by employing the slots in the case of fine adjustment, it can be achieved by replacing the jigs.

Figure 7:
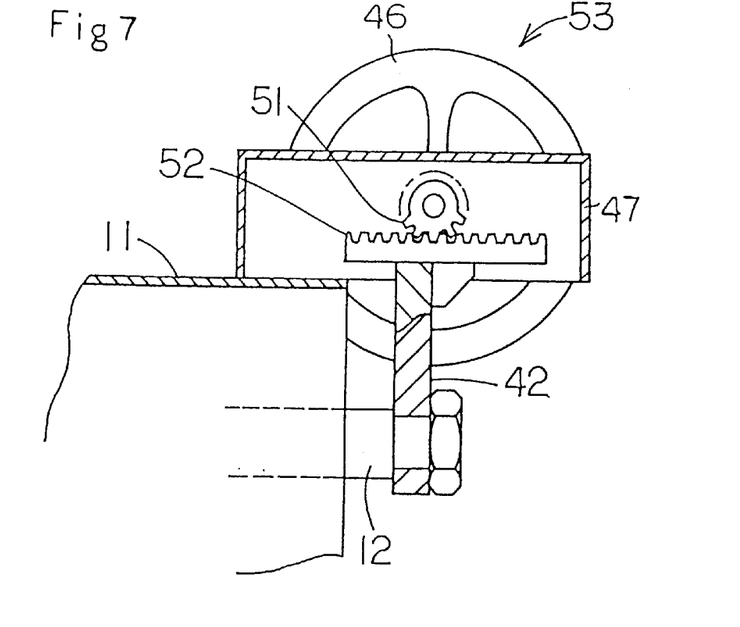
FIG. 7 is a partial cross-sectional view of an advancing-retracting mechanism according to another embodiment of the invention.

The moving mechanism 14 employing the bevel gear 44 may be replaced with a rack and pinion type moving mechanism 53, for example, as shown in FIG. 7. In this mechanism 53, a pinion 51 is attached to the drive shaft 45, and a rack 52 is attached to the upper end of the bracket 42 so as to be engaged with the pinion 51. With respect to the thrust power of the boring device 24, the former moving mechanism 14 is stronger than the latter mechanism 53 because the former advances via a screw. However, with respect to the advancing and retracting stroke of the boring device 24 relative to the turning quantity of the handle 46, the latter mechanism 53 is greater than the former mechanism 14.

What is claimed is:

1. An apparatus for boring a web of a clamped workpiece comprising:

a boring device having a rotational axis oriented perpendicular to the web;

a frame;

a table movable relative to the frame and supporting the boring device;

a jig attached to the frame and abutting the workpiece to position the boring device relative to the workpiece;

an urging mechanism attached to the frame and applying a pressure near the rotational axis of the boring device to urge the workpiece against the jig and the boring device;

wherein the boring device selectively advances towards and retracts from the web of the clamped workpiece in the direction parallel to the rotational axis of the boring device.

2. The apparatus according to claim 1, wherein the urging mechanism comprises:

an operating lever pivotally supported by the frame;

a working lever pivotally connected to the frame separately from the operating lever and including a pressing portion for applying said pressure near the rotational axis of the boring device toward the jig, said pressing portion having an active position and an inactive position; and a link pivotally connected to the operation lever at a first connecting point and to the working lever at a second connecting point;

wherein in the inactive position, the pressing portion is spaced from the workpiece and the second connecting point is located on one side of an imaginary line connecting the rotational center of the operating lever with the first connecting point as the operating lever is rotated; and wherein in the active position, the pressing portion applies the pressure near the rotational axis of the boring device in the direction of the jig and the second connecting point is located on the other side of the imaginary line.

3. An apparatus for boring a web of a clamped workpiece comprising:

a boring device having a rotational axis oriented perpendicular to the web;

a frame comprising a guide member extending parallel to the rotational axis of the boring device and a table, with the boring device attached to the table;

a jig attached to the frame and abutting a first side of the workpiece to position the boring device against the workpiece; and an urging mechanism attached to the frame and applying a pressure to a second side of the workpiece opposite to the first side to urge the workpiece against the jig and the boring device, wherein the boring device selectively advances towards and retracts from the web in a direction parallel to the rotational axis of the boring device, and the urging mechanism and the table are provided with hand grips adapted for lifting the apparatus.

4. The apparatus according to claim 3, wherein the hand grip provided on the table extends parallel to the guide member.

5. An apparatus for boring a web of a clamped workpiece comprising:

a boring device having a rotational axis oriented perpendicular to the web;

a frame comprising a guide member extending parallel to the rotational axis of the boring device and a table reciprocally supported on the guide member, with the boring device attached to the table;

a jig attached to the frame and abutting a first side of the workpiece to position the boring device against the workpiece; and an urging mechanism attached to the frame and applying a pressure to a second side of the workpiece opposite to the first side to urge the workpiece against the jig and the boring device, wherein the boring device selectively advances towards and retracts from the web in a direction parallel to the rotational axis of the boring device.

6. The apparatus according to claim 5, wherein the boring device further comprises:

a motor supported on the table;

a cup-like edge member driven by the motor; and a centering device disposed on the rotational axis of the edge member to determine the center of the bore to be formed in the web.

7. The apparatus according to claim 6, further comprising:
a spring biasing the centering device to project outwardly from the edge member when the centering member is spaced from the workpiece, and to retract into the edge member against the biasing force of the spring when the centering device engages the workpiece.

8. The apparatus according to claim 7, wherein the urging mechanism comprises:
an operating lever pivotally supported by the frame;
a working lever pivotally connected to the frame separately from the operating lever and including a pressing portion for applying said pressure near the rotational axis of the boring device toward the jig, said pressing portion having an active position and an inactive position; and
a link pivotally connected to the operating lever at a first connecting point and to the working lever at a second connecting point,
wherein in the inactive position the pressing portion is spaced from the workpiece and the second connecting point is located on one side of an imaginary line connecting the rotational center of the operating lever with the first connecting point as the operating lever is rotated; and
wherein in the active position, the pressing portion applies the pressure near the rotational axis of the boring device in the direction of the jig and the second connecting point is located on the other side of the imaginary line.

9. The apparatus according to claim 8, wherein the pressing portion attached to the working lever is positionally adjustable.

10. The apparatus according to claim 8, wherein the operating lever has a limit stop for restricting the movement of the working lever.

11. The apparatus according to claim 8, wherein the link has an engaging section engaging the working lever as the operating lever is rotated, and the rotation of the operating lever is transmitted to the working lever by the engaging section.

12. The apparatus according to claim 5, wherein the frame has a pointer for indicating a position to be bored on the workpiece.

* * * * *